United States Patent
Watzenberger

(12) 
(10) Patent No.: US 6,254,735 B1
(45) Date of Patent: *Jul. 3, 2001

(54) PROCESS FOR SEPARATING MEDIUM BOILING SUBSTANCES FROM A MIXTURE OF LOW, MEDIUM AND HIGH BOILING SUBSTANCES

(75) Inventor: Otto Watzenberger, Ludwigshafen (DE)

(73) Assignee: BASF Aktiengesellschaft, Ludwigshafen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/077,584

(22) PCT Filed: Dec. 20, 1996

(86) PCT No.: PCT/EP96/05772

§ 371 Date: Jun. 2, 1998

§ 102(e) Date: Jun. 2, 1998

(87) PCT Pub. No.: WO97/22550

PCT Pub. Date: Jun. 26, 1997

(30) Foreign Application Priority Data

Dec. 20, 1995 (DE) .............................. 195 47 758

(51) Int. Cl.⁷ .................. B01D 3/00; C01B 21/14
(52) U.S. Cl. ................. 203/26; 203/49; 203/98; 203/99; 203/DIG. 19; 423/387
(58) Field of Search .................. 203/99, DIG. 19, 203/49, 24–27, 93–94, 100, 98, DIG. 8, DIG. 9, 71; 423/387

(56) References Cited

U.S. PATENT DOCUMENTS

| | | | |
|---|---|---|---|
| 4,111,759 | | 9/1978 | Didycz et al. ............................ 203/7 |
| 4,234,391 | * | 11/1980 | Seader .................................... 203/26 |
| 4,277,268 | * | 7/1981 | Spangle, Jr. ............................ 203/24 |
| 4,336,046 | * | 6/1982 | Schorre et al. ........................... 62/28 |
| 4,428,799 | * | 1/1984 | Standiford .............................. 203/26 |
| 4,539,076 | * | 9/1985 | Swain ................................... 203/26 |
| 4,929,311 | | 5/1990 | Saft ..................................... 202/158 |
| 4,956,168 | | 9/1990 | Wagaman ............................. 423/386 |
| 5,266,290 | | 11/1993 | Levinthal et al. .................. 423/387 |
| 5,363,657 | * | 11/1994 | Naumovitz ............................. 62/39 |
| 5,385,646 | | 1/1995 | Holiday ................................ 203/11 |
| 5,472,679 | | 12/1995 | Levinthal et al. .................. 423/387 |
| 5,510,097 | | 4/1996 | Cawlfield et al. .................... 423/387 |
| 5,680,775 | * | 10/1997 | Manley ................................. 62/630 |
| 5,837,107 | | 11/1998 | Watzenberger et al. ............... 203/78 |

FOREIGN PATENT DOCUMENTS

| 3528463 | 8/1985 | (DE) . |
| 4324410 | 8/1994 | (DE) . |

OTHER PUBLICATIONS

*Ullmann's Enc. of Ind. Chem.*, vol. B3, pp. 4–46, 1990.

*Perry's Chem. Eng. Handbook*, Section 13, pp. 5–10, 1984.

* cited by examiner

*Primary Examiner*—Virginia Manoharan
(74) *Attorney, Agent, or Firm*—Keil & Weinkauf

(57) ABSTRACT

A process for separating a fraction containing low and middle boilers from a mixture of low, middle and high boilers, which involves treating the mixture in a column with low-boiler vapor in the bottom, so that the middle-boiling component accumulates in the low-boiler vapor and can be obtained at the temperature level of the low-boiling component.

9 Claims, 2 Drawing Sheets

PROCESS FOR SEPARATING MEDIUM BOILING SUBSTANCES FROM A MIXTURE OF LOW, MEDIUM AND HIGH BOILING SUBSTANCES

The present invention relates to a process for separating middle boilers from a mixture of low, middle and high boilers which is separated into a fraction containing low and middle boilers and a fraction containing low and high boilers.

A problem frequently encountered in the chemical industry is the need to separate the middle boilers in pure form or with only traces of low boilers from a liquid multi-substance mixture consisting of a low- (L), middle- (M) and high-boiler (H) fraction.

To do this it is possible to employ the known distillation methods, for example those described in Ullmann's Encyclopedia of Industrial Chemistry Vol. B3, page 4–46 et seq. A common feature of the known distillation methods is that the high boilers are drawn off at the bottom in pure form, or possibly with residual traces of middle boilers, and that the middle-boiling component is separated off at the top of the column at temperatures determined largely by the concentration of the high-boiling component and its boiling temperature. Furthermore, with the known methods it is not possible to co-separate a mixture of low and middle boilers while at the same time separating out a mixture of low and high boilers which is free from middle boilers. In many cases, however, this would be desirable, especially if low and high boilers are to be put to some further conjoint use (sale, recovery, disposal).

Page 4–48 of the abovementioned publication describes the use of side columns for separating middle boilers from the mixture of low, middle and high boilers (L,M,H mixture). In this case too, low and high boilers are always separated. The same applies to the directly or indirectly coupled columns describe on pages 4–62 and 4–63 in the abovementioned publication. In all of these cases it is ultimately necessary to separate the middle-boiling component from the high-boiling component by means of distillation, which in every case requires boiling temperatures which are at least equal to that of the middle-boiling component and, in extreme cases, are close to the boiling temperature of the high-boiling component and are therefore very high. This is particularly the case if the middle-boiling component must be separated completely from the high-boiling component. Such high temperatures may arise that, even in the caseof relatively heat-stable substances, decomposition or chemical conversion (polymerization etc.) of the substances involved may occur. For this reason, complex distillation techniques, for example gentle distillations carried out under reduced-pressure conditions (thin-film evaporators, molecular jet distillation, etc.) are often necessary for separation tasks of this kind. Such distillation techniques have the disadvantage that the through-puts are extremely low. This leads to high capital investment and product costs, which may mean that a distillative separation which per se is advantageous may not be economic to carry out.

Also known are special techniques for separating difficult-to-separate liquid mixtures. Special techniques are only relevant if they are more cost-effective or when other, common techniques have failed. They are frequently employed with substances whose capacity to withstand thermal stress is limited, ie. if the boiling point is above or close to the decomposition temperature. A known method of separating components of low volatility from mixtures comprising immiscible components is that of carrier-gas distillation. The basis for this method is that, in a mixture of immiscible substances, each substance behaves as if the other was not there; in other words, at a given temperature, each substance possesses a partial pressure which—independently of the composition of the mixture—is equal to the vapor pressure of the substance concerned. Consequently, the pressure over such a mixture is equal to the sum of the vapor pressures of the individual components. A known example of this is the water/bromobenzene system. The mixture boils at 95° C., whereas the pure substances boil at 100° C. (water) and 156° C. (bromobenzene). Carrier-gas distillation is suitable in particular for separating immiscible components of relatively high boiling point (eg. glycerol), for separating substances which polymerize or decompose even before reaching the boiling point (fatty acids), and for separating substances which are very difficult to handle and for which direct heating to the boiling point may be hazardous (eg. turpentine).

The best-known example of carrier-gas distillation is steam distillation, ie. where steam is the carrier gas. It is extensively employed, for example, in the petroleum-processing industry, for removing light hydrocarbons from absorber oils; in the coal industry, for the steam distillation of hydrocarbon cuts from the coal distillation operation; for separating off turpentine from resins in the rubber industry; and in preparative organic chemistry. Steam distillation is a special form of azeotropic or extractive distillation, as described in the abovementioned publication on pages 4–50 to 4–52. The technical effect of this process is based on the finding that, by adding a substitute substance (an entrainer), the azeotropic point is surpassed and, consequently, the desired concentration above the azeotropic point is achieved.

All of these techniques have the disadvantage that an additive (entrainer) is introduced into the system which is to be distilled, and this entrainer then has to be separated off from the system again by way of an additional process step.

A further known method of removing relatively high-boiling substances from a mixture of substances is stripping. Stripping has the disadvantage that it always produces only a highly dilute solution of the high- boiling component or middle-boiling component in the stripping medium, thereby necessitating a laborious and costly separation. In general, the process is only economical when the products can be separated by phase separation, ie. when the mixture of substances exhibits a miscibility gap.

It is an object of the present invention, therefore, to provide a simple and gentle process for separating a middle-boiling component or a fraction comprising low and middle boilers from a mixture which includes low, middle and high boilers.

We have found that this object can be achieved, surprisingly, if the abovementioned mixture in a column is treated in the bottom with low-boiler vapor.

The present invention consequently provides a process for separating a fraction containing low and middle boilers (L,M fraction) and a fraction containing low and high boilers (L,H fraction) from a homogeneous mixture comprising low, middle and high boilers (L,M,H mixture), which comprises treating the L,M,H mixture in a column with low-boiler vapor and separating it into an L,M fraction and an L,H fraction. The middle-boiling component accumulates in the low-boiler vapor, so that the L,M fraction can be recovered above the infeed site of the mixture, and the L,H fraction is obtained in the liquid phase.

The mixture to be separated is generally passed directly to the top of the column. The treatment of the mixture with the low-boiler vapor is preferably carried out in countercurrent and, in particular, by passing low-boiler vapor into the bottom of the column or by supplying liquid low-boiling component and boiling it up in the bottom. The low-boiling component supplied to the column is usually the same as that present in the mixture.

It has been found particularly advantageous to carry out the treatment with low-boiler vapor in a stripping column. This can be a customary plate column, for example a bubble-cap or sieve plate column, or can be provided with a customary packing, for example Raschig rings, Pall rings, saddles, etc., and preferably has a theoretical plate number in the range from 5 to 100. Depending on the separation task at hand, the plate number may even be more than 100.

As a result of passing low-boiler vapor into the bottom of the column, the middle-boiling component accumulates in the low-boiler vapor. The L,M fraction is advantageously obtained at or above the vertical level of the infeed plate. Preferably, the L,M fraction is drawn off from the top of the column.

The L,M fraction generally comprises the low-boiling component in a large to very large excess. It is therefore particularly advantageous to concentrate the L,M fraction in order to enrich it with middle-boiling component. This can be done, for example, by passing the L,M fraction into a separate, multistage column, which serves as a rectifying column, in which the low-boiling component is separated off to give an L,M fraction richer in middle-boiling component, or even a pure middle-boiling component.

Figure 3:
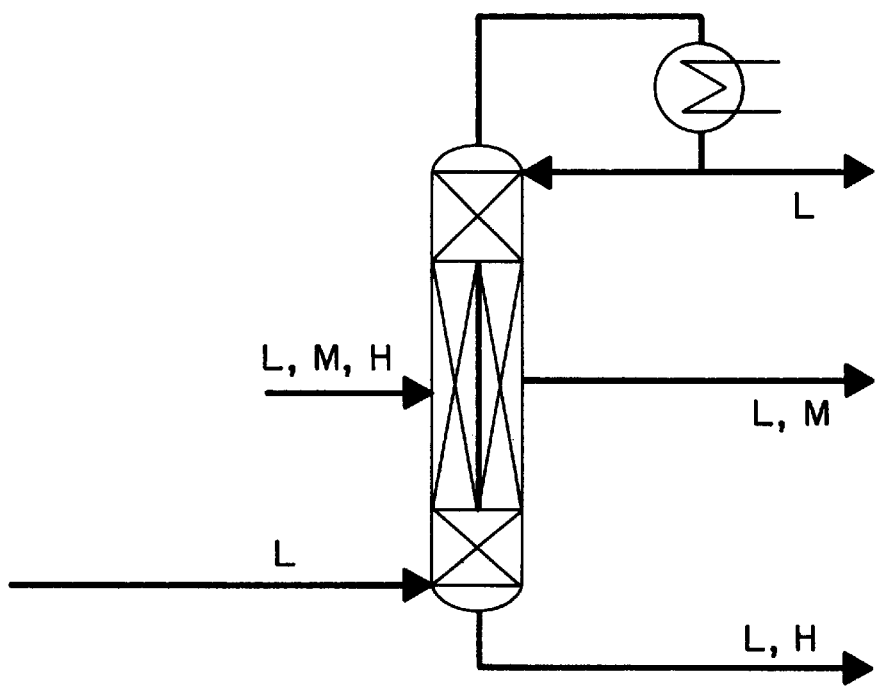
FIG. 3 is an alternate embodiment illustrating the presence of a combined stripping-rectifying column with an essentially vertical dividing wall separating the rectifying section from the stripping section.

It is particularly preferable to provide the rectifying column as a separate distillation column or to mount it directly onto the column in which treatment with low-boiler vapor takes place and to distill off the low-boiling component from the top. The enriched L,M fraction or the middle-boiling component can be removed via a sidestream offtake of the column return flow. It is particularly preferred in this context to employ an essentially vertical dividing wall as illustrated by FIG. 3. In this case, the mixture which is to be separated is supplied approximately in the center of the stripping-rectifying column. At the vertical level of this supply point, a dividing wall is installed in the column over an extent of in general from 1 to 10, from 1 to 5, theoretical plates in such a way that the column is divided vertically into two separate sections, infeed taking place approximately in the center of the dividing wall. In this way, the fraction enriched with medium-boiling component can be taken off on the side opposite the infeed site, in the region of the dividing wall. The dividing wall separates the offtake site from the infeed site. Equal concentrations of medium-boiling component are present on either side of the dividing wall, although high boilers are present in the mixture only on the infeed-site side. The fraction enriched with medium-boiling component is preferably taken off approximately at the vertical level of the infeed or, if appropriate, somewhat below this point.

Figure 2:
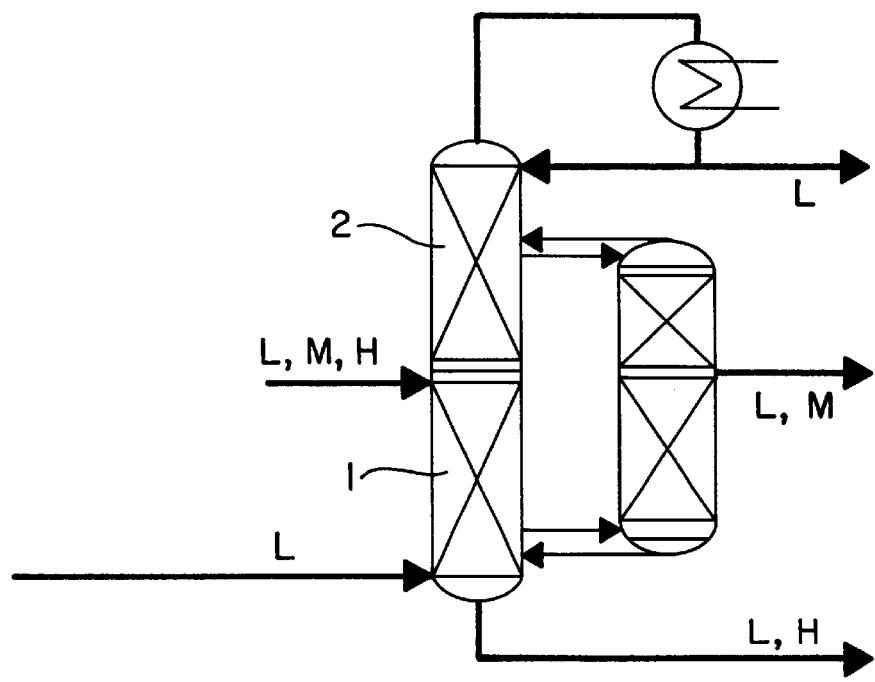
FIG. 2 is an alternate embodiment illustrating the presence of a side column.

As an alternative to the embodiment including a dividing wall, it is also possible to mount a side column up against the stripping-rectifying column, in such a way that the side column communicates with the gaseous and liquid phases of the stripping-rectifying column in each case at one or more separating stages above and below the infeed site, and the fraction richer in middle-boiling component is taken off via the side column. The side column is configured such that high-boiling component cannot pass over to the offtake side of the side column. Measures suitable for this purpose are familiar to the skilled worker. This embodiment is shown in FIG. 2.

If desired, a droplet separator (demister or other customary device) may be installed over the infeed plate or in the vapor offtake in such a way as to prevent the high-boiling component being entrained by means of droplets.

The L,M fraction enriched in middle-boiling component by the abovementioned rectifying column may, if desired, be separated or concentrated in a further column with a rectifying section and a stripping section.

A further advantageous embodiment of the novel process comprises passing the vapors from the stripping column or stripping-distillation column, possibly after conventional compression, as low-boiling components or low-boiler vapor back into the bottom of the treatment column. Since in the novel process direct heating takes place with low-boiling component or low-boiler vapor, and vapor compression need only overcome the differential pressure over the column, it is possible to bring about a drastic reduction in energy consumption and, at the same time, in the input required for cooling.

The treatment column and/or rectifier or distillation column can be operated at atmospheric, subatmospheric or superatmospheric pressure and continuously or batchwise. Against this background, the conditions depend of course on the mixtures to be separated, and can be determined by the skilled worker in a conventional manner. A critical factor is the temperature of the low-boiler vapor, which must be high enough for the L,M fraction to be distilled off and the L,H fraction to be obtained in the bottom of the column.

The novel process has the advantage that it is easy to carry out and that it manages without the addition of any extraneous substance. The concentration of middle-boiling component is low over the entire process range. The residence time in the process, ie. in the columns, is relatively short. Owing to the simplicity of the process, the capital investment required is low. Moreover, the process is almost infinite in its scale-up possibilities.

The novel process makes it possible to carry out extremely gentle separation of an L,M fraction or of the middle-boiling component from a mixture comprising low, middle and high boilers, at the temperature level of the boiling point of the low-boiling component. The process is therefore particularly advantageous if it is necessary to separate as gently as possible a thermally sensitive middle-boiling component, which has a tendency, for example, to undergo decomposition or polymerization, from an L,M,H mixture. The process is particularly advantageous if the high-boiling component present in the crude mixture is, in its pure or highly enriched form, alternatively of high viscosity, precipitates as a solid, or at a relatively high concentration has a tendency to enter into a chemical reaction, for example a polymerization. The novel process in fact ensures that the high-boiling component dissolved in the low-boiling component can be stripped off. As a result, it is necessary only to handle solutions; in other words, problems with viscosity, solids, etc., are avoided.

The novel process is particularly suitable for obtaining thermally sensitive products. Examples of this application are:

obtaining an aqueous hydroxylamine solution from an aqueous solution of a hydroxylamine salt, obtaining polymerizable compounds, for example recovering styrene from mixtures obtained in the production of styrene, obtaining chlorinated hydrocarbons, for example recovering dichloroethane from mixtures obtained in the production of dichloroethane, recovering carboxylic acids and aldehydes from the stripping acids of cyclohexane oxidation with air or from the production of adipic acid, separating organic acids and aldehydes, such as acetic acid, acrylic acid, methacrolein or methacrylic acid, from production effluence which may still contain high boilers, organic compounds, salts (catalysts), etc., and separating amines from mixtures comprising ammonia and high boilers.

Figure 1:
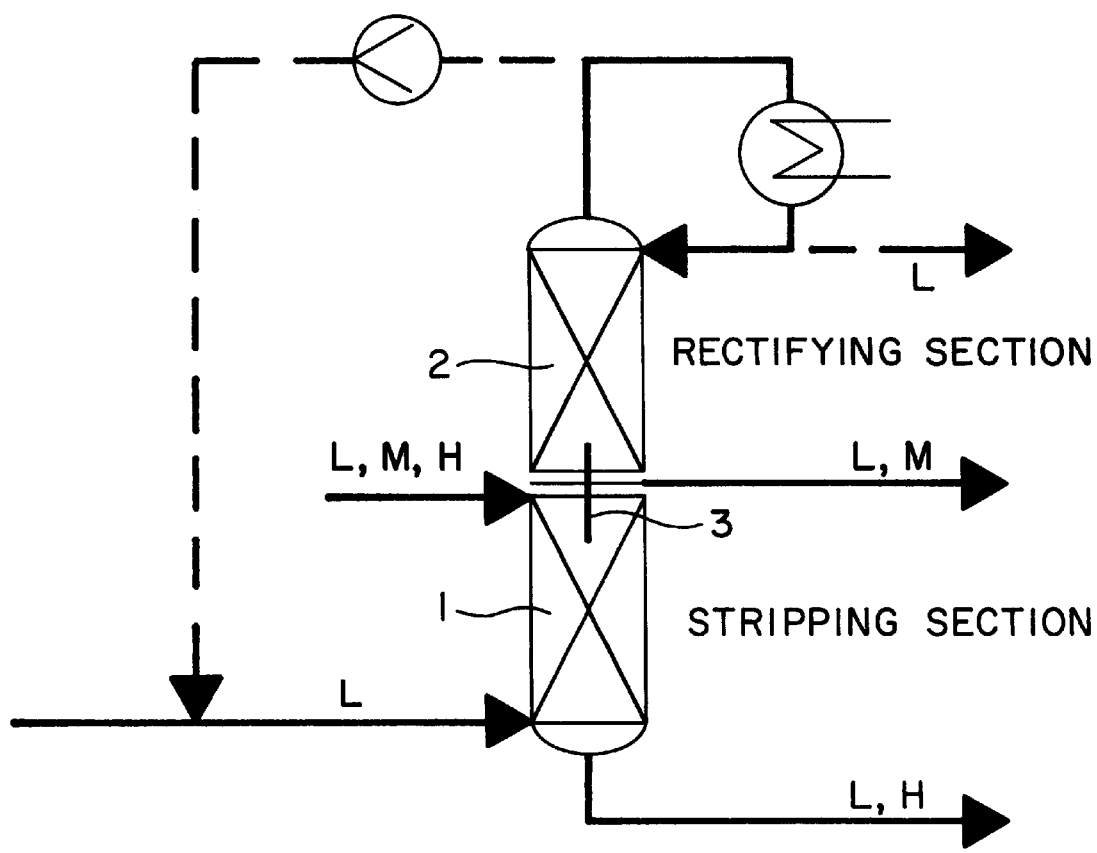
FIG. 1 is a schematic flow diagram of the separation process of this invention illustrating the orientation of the rectifying and stripping sections of the process.

The novel process is illustrated in more detail with reference to the layout shown in FIG. 1:

FIG. 1 shows a column for separating an L,M,H mixture, comprising a stripping column 1 on which a rectifying column 2 is mounted. The mixture to be separated is supplied directly to the top of the stripping column 1. A dividing wall 3 is installed at the vertical level of the supply point. Low-boiler vapor L is passed into the bottom of the stripping column 1 in countercurrent to this mixture. At the bottom of the column, an L,H fraction is taken off, while at the top of the column an L,M fraction is obtained which is essentially free from high-boiling components. This fraction is concentrated, ie. enriched with medium-boiling component, in the rectifying column. The enriched L,M fraction is taken off somewhat above the infeed site of the mixture to be separated. Low-boiling component is obtained at the top of the rectifying column, and can if desired be condensed and passed on for subsequent utilization. Alternatively, the low-boiling component can be passed back, directly or after compression, into the bottom of the stripping column 1.

DESCRIPTION OF THE PREFERRED EMBODIMENTS

The examples which follow illustrate the invention without restricting it.

EXAMPLE 1

Obtaining an aqueous hydroxylamine (HA) solution from a hydroxylamine (HA)/ammonium sulfate (AS) solution using a stripping column An aqueous solution containing 218 g of HA/l and 680 g of AS/l was supplied at a rate of 300 ml/h to the topmost stage of a stripping column. The stripping column was made of glass, had a height of 2 m and a diameter of 35 mm, and was packed over a vertical extent of 1.8 m with 3 mm glass Raschig rings. 1000 ml/h of distilled water were supplied to the bottom of the column. The column was under a pressure of 40 kPa. The bottom temperature was 84° C. 1000 ml/h of aqueous, salt-free HA solution were distilled off at a rate of 39.0 g of HA/h from the top of the column, corresponding to 59.6% of the entire HA in the feed. 300 ml/h of ammonium sulfate solution with an HA content of 86.0 g of HA/l were taken off from the bottom of the column. This corresponds to 39.4% of the total HA in the feed.

The maximum concentration of HA in the column was 100 g/l. The quantity of liquid in the column, depending on the particular loading, was 20–225 ml. The residence time of the liquid in the column was therefore only 1.5–10. minutes.

The decomposition rate is low at this low concentration and within the short time.

Further experiments are set out in the table below.

TABLE 1

Separation of an aqueous HA solution from an aqueous HA/AS solution

| Feed | HA content | $H_2O$/- | Pressure | Column-head temperature | HA from the top | | HA at the bottom | |
|---|---|---|---|---|---|---|---|---|
| ml/h | g/l | Steam | kPa | °C. | g/l | (%) | g/l | (%) |
| 318 | 222 | 1156* | 50.0 | 81.0 | 40.5 | 66.9 | 48.6 | 21.2 |
| 170 | 222 | 1060* | 70.0 | 90.5 | 22.8 | 65.6 | 45.2 | 17.2 |
| 370 | 219 | 1475Δ | 100.4 | 100.9 | 32.4 | 62.2 | 75.6 | 47.8 |
| 179 | 105.5 | 1530Δ | 100.8 | 100.6 | 9.0 | 70.5 | 29.0 | 27.6 |
| 245 | 220.0 | 1530Δ | 100.8 | 100.6 | 28.0 | 73.3 | 54.0 | 42.2 |
| 150 | 4 | 990Δ | 100.8 | 100.0 | 0.4 | 68.1 | 0.8 | 15.7 |
| 150 | 5.6 | 990Δ | 100.8 | 99.9 | 0.6 | 73.0 | 0.4 | 5.6 |
| 119 | 20.4 | 1063Δ | 101.5 | 100.4 | 15.4 | 67.6 | 40.5 | 19.7 |

*The bottom of the column was heated by way of a thermostat.
ΔFor simultaneous bottom heating, the water was supplied as superheated steam.

EXAMPLE 2

Separation of an aqueous EA solution from an aqueous HA/$Na_2SO_4$ solution using a stripping column The aqueous solution from Example 3, containing 11% by weight of HA and 23.6% by weight of $Na_2SO_4$, was supplied at a rate of 978 g/h to the topmost stage of a stripping column. The stripping column was made of enamel, had a height of 2 m and a diameter of 50 mm, and was packed with 5 mm glass Raschig rings. The column was at atmospheric pressure. Steam at 2.5 bar absolute was passed into the bottom of the column. The steam/feed ratio was 2.9:1. 985 g/h of sodium sulfate solution with an HA content of 1.7 g of HA/l were taken off from the bottom of the column. This corresponds to 1% of the entire HA in the feed. 3593 g/h of aqueous, salt-free HA solution containing 36.8 g of HA/l were distilled off from the top of the column, corresponding to 99.2% of the entire HA in the feed.

Further experiments are set out in the table below.

TABLE 2

Separating an aqueous HA solution from an aqueous HA sodium sulfate solution

| Feed | HA content | Steam/Feed | Pressure | Column-head temperature | HA from the top | | HA at the bottom | |
|---|---|---|---|---|---|---|---|---|
| g/h | g/l | kg/kg | kPa | °C. | g/l | (%) | g/l | (%) |
| 945 | 135 | 2.6 | 200 | 124.5 | 34.0 | 84.0 | 7.8 | 17 |
| 970 | 136 | 2.7 | 101 | 106.3 | 35.5 | 96.2 | 3.3 | 2.5 |
| 980 | 80 | 2.8 | 101 | 107.0 | 2.1 | 95.5 | 0.45 | 5.7 |

EXAMPLE 3

Obtaining an aqueous HA solution from an aqueous RA/sodium sulfate solution using a stripping-distillation column An aqueous solution containing 221 g of HA/l and 540 g of AS/l was supplied at a rate of 202 ml/h onto the 11th tray of a glass bubble-cap column with a diameter of 35 mm, an overall height of 1.6 m and with 21 trays (lowest tray=tray 1). 1300 ml/h of steam (at about 125° C.) were supplied to the bottom of the column. The pressure in the column was 99 kPa. At the top of the column, 180 ml/h of substantially HA-free water (0.6 g of HA/l) were taken off at a column-head temperature of 99.8° C. and with a reflux ratio of 1:3 (return flow: infeed). The aqueous HA solution (product solution) was taken off at a rate of 1180 ml/h and with a concentration of 44 g/l via a sidestream, from tray 12. 400 ml/h of salt solution were taken off at the bottom of the column.

EXAMPLE 4

Obtaining an aqueous HA solution from an aqueous HA sodium sulfate solution using a stripping-distillation column, with concentration via a side offtake.

An aqueous HA solution as in Example 3, containing 11% by weight of HA and 23.6% by weight of $Na_2SO_4$, was supplied to the 11th theoretical plate of a glass bubble-cap column with a diameter of 50 mm (tray number corresponding to 30 theoretical plates). Steam at 2.5 bar absolute and at about 125° C. was supplied to the bottom of the column. The pressure in the column was 101 kPa. Substantially HA-free water (0.05 g of HA/l) was taken off at the top of the column. The aqueous, salt-free HA solution (product solution) was withdrawn in liquid form, with a concentration of 8.3% by weight, via a sidestream from tray 12. The salt solution was taken off at the bottom of the column with a residual HA content of 0.2% by weight.

EXAMPLE 5

Concentration of a salt-free aqueous hydroxylamine solution by distillation

In a glass bubble-cap column with a diameter of 50 mm and 30 bubble-cap trays, 1600 g/h of an 8.3% strength by weight aqueous, salt-free stabilized hydroxylamine solution were fed continuously onto the 8th tray. In addition, a small quantity of stabilizer, dissolved in hydroxylamine solution, was metered into the column at the topmost tray, tray no. 30. The reflux ratio was set at 0.5. Water was distilled off from the top of the column. The distillate still contained a residual quantity of hydroxylamine of 0.07% by weight. About 240 ml/h of a 50% strength by weight hydroxylamine solution were discharged by means of a pump from the bottom of the column.

We claim:

1. A process for separating a fraction containing low and middle boilers (L,M fraction) from a homogeneous mixture comprising low, middle and high boilers (L,M,H mixture), which process comprises supplying the L,M,H mixture to the top of a treating column, treating the L,M,H mixture with low-boiler vapor L in the bottom of the treating column and separating the L,M,H mixture into an L,M fraction and a fraction having low and high boilers (L,H fraction), wherein the treating column is a stripping column and wherein the L,M fraction is taken off at or above the level at which the L,M,H mixture is supplied to the treating column while the L,H fraction is taken off at the bottom of the treating column.

2. The process of claim 1, wherein the low-boiler vapor is passed into the bottom of the treating column.

3. The process of claim 1, wherein the treatment takes place in countercurrent.

4. The process of claim 1, wherein the L,M fraction is passed into a rectifying column in which the low boiler is separated off so as to give an L,M fraction richer in the middle boiler.

5. The process of claim 4, wherein the rectifying column is mounted onto the treating column, the low boiler is distilled off from the top of the rectifying column, and the L, M fraction enriched with middle boiler is removed by way of a sidestream offtake.

6. The process of claim 5, wherein the treating column communicates with the bottom of a side column and the rectifying column communicates with the top of the side column. countercurrent.

7. The process of claim 5, wherein the low boiler taken off from the rectifying column at least in part is compressed and passed back into the bottom of the treating column.

8. The process of claim 4, wherein the treating column and the rectifying column together form a combined stripping-rectifying column and said stripping-rectifying column is equipped with an essentially vertical dividing wall; said dividing wall being situated at the level at which the L,M,H mixture is supplied.

9. The process of claim 1, wherein the L,M fraction is further separated or concentrated.

* * * * *